United States Patent [19]
Pazos et al.

[11] Patent Number: 5,689,012
[45] Date of Patent: Nov. 18, 1997

[54] CONTINUOUS PREPARATION OF LOW UNSATURATION POLYOXYALKYLENE POLYETHER POLYOLS WITH CONTINUOUS ADDITON OF STARTER

[75] Inventors: José F. Pazos, Havertown; T. Thomas Shih, Bryn Mawr, both of Pa.

[73] Assignee: ARCO Chemical Technology, L.P., Greenville, Del.

[21] Appl. No.: 683,356

[22] Filed: Jul. 18, 1996

[51] Int. Cl.[6] .................................................. C07C 43/11
[52] U.S. Cl. .......................... 568/619; 568/620; 568/621; 568/613; 502/175
[58] Field of Search ................................ 568/621, 620, 568/613, 619; 502/175

[56] References Cited

U.S. PATENT DOCUMENTS

| | | |
|---|---|---|
| 3,393,243 | 7/1968 | Cuscurida . |
| 3,404,109 | 10/1968 | Milgrom . |
| 3,427,334 | 2/1969 | Akros . |
| 3,538,043 | 11/1970 | Herold . |
| 3,900,518 | 8/1975 | Milgrom . |
| 3,941,849 | 3/1976 | Herold . |
| 4,282,387 | 8/1981 | Olstowski et al. . |
| 4,477,589 | 10/1984 | van der Hulst et al. . |
| 5,010,187 | 4/1991 | Heuvelsland . |
| 5,114,619 | 5/1992 | Heuvelsland et al. ............ 252/182.27 |
| 5,145,883 | 9/1992 | Saito et al. . |
| 5,158,922 | 10/1992 | Hinney et al. . |
| 5,470,813 | 11/1995 | Le-Khac . |
| 5,482,908 | 1/1996 | Le-Khac . |

FOREIGN PATENT DOCUMENTS 203735  11/1983  Germany .

OTHER PUBLICATIONS

"Testing Urethane Foam Polyol Raw Materials", ASTM D–2849–69, pp. 913–931, Dec. 19. 1969.

*Primary Examiner*—Gary Geist
*Assistant Examiner*—S. Padmanabhan
*Attorney, Agent, or Firm*—Jonathan L. Schuchardt

[57] ABSTRACT

A continuous process for the preparation of polyoxyalkylene polyethers using DMC catalysts as the polyoxyalkylation catalyst employs continuous addition of alkylene oxide in conjunction with continuous addition of starter and catalyst to a continuous oxyalkylation reactor. Despite the continuous introduction of starter, the molecular weight distribution of the polyether product is quite narrow, as indicated by the exceptionally low polydispersity of the product. The presence of low molecular weight species during the majority of the polyoxyalkylation also substantially eliminates extremely high molecular weight fractions having molecular weights greater than 100,000 Da, again without appreciably broadening molecular weight distribution. By withdrawing intermediate molecular weight polyether product or diverting a portion of the end product to prepare a catalyst/starter mixture, rapid and sustained reaction rates can be achieved while employing low molecular weight starters. Continuous build ratios in excess of 0.98 can be achieved.

31 Claims, 3 Drawing Sheets

CONTINUOUS PREPARATION OF LOW UNSATURATION POLYOXYALKYLENE POLYETHER POLYOLS WITH CONTINUOUS ADDITON OF STARTER

TECHNICAL FIELD

The present invention pertains to a continuous process for the preparation of polyoxyalkylene polyether polyols employing continuous addition of starter. More particularly, the present invention pertains to a fully continuous process employing double metal cyanide complex oxyalkylation catalysts to produce a low unsaturation, narrow polydispersity polyether product substantially free of exceptionally high molecular weight fractions.

BACKGROUND ART

Polyoxyalkylene polyethers are well known items of commerce with a myriad of uses. For example, block, random, and block random polyoxyalkylene copolymers are widely used as non-ionic surfactants. In block surfactants in particular, relatively large polyoxypropylene blocks provide the hydrophobic moiety, while polyethylene blocks provide the hydrophile. Surfactants are generally mono- or difunctional, and in many cases, the actual functionality is of little importance to surfactant properties.

However, the largest use of polyoxyalkylene polyethers is in polymer preparation. Elastomeric copolyesters may be produced by reaction of a dicarboxylic acid with a low molecular weight diol such as ethylene glycol or 1,4-butanediol, and a high molecular weight diol such as a 1000 Da to 4000 Da polyoxypropylene glycol. Far larger is the usage of polyoxyalkylene polyethers is in the production of polyurethanes. In such applications, functionality is important for chain extension and molecular weight build, and in the case of functionalities greater than two, for crosslinking. In most polyurethane applications, all or a substantial portion of the polyether comprises polyoxypropylene blocks.

In the preparation of polyoxypropylene polymers, whether for a surfactant hydrophobe or a polyol for polyurethane production, a starter molecule having oxyalkylatable hydrogen atoms is oxypropylated with propylene oxide in the presence of a suitable catalyst. In the past, virtually all polyoxyalkylene polyethers have been prepared using simple and inexpensive basic catalysts such as sodium and potassium hydroxides or alkoxides. During oxypropylation, propylene oxide and certain other higher alkylene oxides are subject to a competing internal rearrangement which generates unsaturated alcohols. For example, propylene oxide rearranges to allyl alcohol during oxypropylation. The mechanism for this rearrangement is discussed in Ceresa, Ed., BLOCK AND GRAFT POLYMERIZATION, Vol. 2, John Wiley & Sons, pp. 1721. Unsaturation is measured in accordance with ASTM D2849–69, "Testing of Urethane Foam Polyol Raw Materials."

By whatever mechanism the rearrangement is facilitated, the continued generation of unsaturated, monohydroxyl-functional species has great consequences in polyol production, most of them undesirable. First, as the amount of monofunctional species increases, the functionality of products prepared from starter molecules having functionalities of two or higher steadily decreases. For example, in a polyoxypropylene polyol having an equivalent weight in the neighborhood of 2000 Da, the content of monofunctional species may approach 30 to 40 mol percent. Thus, a 4000 Da molecular weight diol may have an actual functionality of only 1.6 to 1.7 rather than the theoretical or "nominal" functionality of two. A triol of similar equivalent weight may have an actual functionality of 2.0 or lower. Note that equivalent weights and molecular weights expressed in Da (Daltons) are number average equivalent and molecular weights unless indicated otherwise.

In addition to altering functionality, the rearrangement alluded to previously alters the molecular weight distribution significantly during base-catalyzed oxypropylation as well. The continued generation of allyl alcohol and its continued oxypropylation results in the presence of exceptionally low molecular weight species including allyl alcohol itself, as well as oligomeric and polymeric oxypropylation products having from but one oxypropylene moiety to in excess of 30 to 40 or more oxypropylene groups. This continuous spectrum of oxyalkylated monols causes the polyol product to have a broad molecular weight distribution and high polydispersity, $M_w/M_n$. The broad molecular weight distribution causes significant effects both in surfactant applications as well as in polyurethane and other polymer syntheses.

In addition to the effects of lowered functionality and broadened molecular weight distribution, the presence of the ethylenically unsaturated group itself may also affect properties and processing. For example, the unsaturation in polyols has been cited as one factor in scorch and discoloration which often occurs in polyurethane slab foam production; and in polyurethane or polyester elastomers, ethylenically unsaturated groups may crosslink over time, altering elastomer properties as a result.

Attempts to lower unsaturation have been many. For example, employing basic catalysts at temperatures considerably lower than normal oxyalkylation temperatures allows synthesis of low unsaturation polyols. However, the reaction time is measured in days or even weeks, and thus such processes are not capable of commercialization. Much effort has been expended to discover new catalysts which are capable of preparing low unsaturation polyols with reasonable reaction times. Use of rubidium and cesium hydroxides has been proposed in U.S. Pat. No. 3,393,243. However, catalyst expense is high, and the improvements modest. In like fashion, barium and strontium oxides and hydroxides have been proposed as catalysts, as disclosed in U.S. Pat. Nos. 5,010,187 and 5,114,619. However, both catalysts are toxic, and therefore virtually complete catalyst removal from the polyether product is necessary. As with the higher alkali metals, improvements are modest. Use of alkaline earth metal carboxylates, e.g. calcium napthenate, optionally in conjunction with tertiary amine cocatalysts has also been disclosed, for example in U.S. Pat. No. 4,282,387, but improvement in levels of unsaturation is limited, typical unsaturations ranging from 0.02 to 0.04 meq/g. Moreover, the reaction rate is not significantly increased.

Continuous processes have been proposed for base catalyzed oxyalkylation, but only for the purposes of increased throughput. Such processes do not materially alter the level of unsaturation. For example, introduction of the starter molecule and basic catalyst at one end of a tubular reactor having a multiplicity of alkylene oxide addition ports along the reactor path allows continuous polyol production. However, oxyalkylation time and temperature are not generally different than batch reactions, and therefore the transit time must be lengthy, either requiring a modest length, large diameter, low velocity conduit; or a small diameter, higher velocity, but exceptionally long conduit in order to provide both long reaction time and high throughput. Due to the lengthy reaction time and use of conventional oxyalkylation temperatures, the level of unsaturation of such polyols is not significantly different from those of batch-prepared polyols, and it is not believed that any such processes are being employed commercially.

In the 1960's, a new class of catalysts termed double metal cyanide complex catalysts were developed. These catalysts proved highly effective for several polymerization reactions, and proved capable of preparing very low unsaturation polyols (0.018 to 0.020 meq/g unsaturation, in general) with reasonable reaction times. However, the expense of the catalysts coupled with the necessity of removing catalyst residues from the product, which proved to be both time consuming and expensive, prevented any large scale commercialization.

In the late 1970's and early 1980's, double metal cyanide complex catalysts (DMC catalysts) were revisited. Improvements in catalytic properties resulted in further lowering of unsaturation to the range of 0.015 meq/g to 0.018 meq/g. Furthermore, increased catalytic activity and development of new catalyst residue removal methods encouraged commercialization for a short time.

More recently, the ARCO Chemical Company has developed strikingly improved DMC catalysts which are capable of preparing polyoxypropylene polyols which display unprecedentedly low levels of unsaturation, in the range of 0.004 to 0.007 meq/g, and which also offer dramatically improved reaction rates as well as economical catalyst removal, often by simple filtration. The catalytic activity is so high, that it has now become feasible to use exceptionally small amounts of catalyst, such that the residual transition metal content in the polyol product is below commonly specified maximum levels, and no catalyst removal is even necessary. Polyols prepared using these catalysts have recently been commercialized as ACCLAIM™ polyols by the ARCO Chemical Company.

DMC catalysts are unique in many aspects. For example, DMC catalysts have required an induction period before the catalyst becomes active. The catalyst is mixed with starter, and traces of water and air removed. Catalyst activation is verified following initial introduction of alkylene oxide by a noticeable pressure drop. Following activation, polymerization proceeds rapidly as additional alkylene oxide is added. Preactivated catalyst/starter mixtures may be stored for later use provided that care is taken to exclude moisture, oxygen, etc. Low molecular weight starter molecules tend to have lengthy induction periods, and in some cases, with low molecular weight starter molecules such as water, ethylene glycol, propylene glycol, etc., the catalyst may not become activated, or is temporarily activated followed by deactivation.

Once activated, DMC catalysts are also known to be inefficient when used with very low molecular weight starter molecules. Propylene glycol and water, for example, often oxyalkylate very sluggishly, and sometimes result in catalyst deactivation. For this reason, higher molecular weight starter molecules, for example those having molecular weights in the range of 300 Da to 2000 Da are generally used. Lower molecular weight oligomeric or polymeric starter molecules, e.g. those with equivalent weights in the range of 150 Da to 1000 Da may be prepared by traditional base catalysis. However, the basic catalyst must be scrupulously removed from these starters, as even traces of strong bases deactivate DMC catalysts.

The necessity of using higher molecular weight starter molecules limits the commercial applicability of DMC-catalysis in the preparation of polyoxyalkylene polyethers. Not only must the starter molecules be prepared by a different process, generally requiring catalyst removal, but the "build ratio" is adversely affected. Thus, use of a 650 Da equivalent weight starter molecule to produce a 2000 Da equivalent weight product represents a build ratio of approximately 3. One third of total reactor capacity is used solely for providing the necessary amount of starter. In contrast, build ratios in excess of 20 are common in base catalyzed oxypropylation, for example, oxypropylation of propylene glycol to produce a 1500 Da molecular weight polyoxypropylene glycol. A 4000 Da glycol based on the same starter would represent a build ratio of approximately 53. Maximum process efficiency, and therefore minimum cost, is only achieved at high build ratios.

Advantage was taken of the ability to prepare activated DMC catalyst/starter mixtures in East German Patent No. 203,735 which employed such mixtures as the feed for a continuous polyether preparation process. In this process, an activated catalyst/starter mixture from a holding tank is introduced into the inlet of a continuous, tubular reactor. Alkylene oxide is fed at multitudinous points along the reactor. The catalyst must be activated by exposure to alkylene oxide in the presence of starter, and a large amount of catalyst/starter mixture is consumed in the process. The build ratio is low, and there is no apparent improvement in polyol properties. The patent discloses that the products are rather hazy. No continuous, DMC-catalyzed polyol process is believed to be commercially practiced.

Although the closer-to-nominal functionality, narrower molecular weight distribution, and higher molecular weights made possible through use of DMC catalysts have been touted as enabling preparation of higher performance polymers, particularly polyurethanes, these polyols have not proven to be the panacea expected. Substitution of DMC-catalyzed polyols for conventional polyols has as often resulted in poorer performing polymers as in polymer improvement. In some systems, for example flexible polyurethane foams, total foam collapse often occurs. While the reasons for the anomalous behavior of polyols prepared with DMC catalysts are not completely known, it has been recently and surprisingly discovered that such polyols contain a very small but very high molecular weight fraction, with molecular weights in excess of 100,000 Da. In polyurethane foam systems, this high molecular weight fraction is believed to exhibit surface active properties, destabilizing the rising foam, and resulting in foam collapse. In elastomers and other systems, this high molecular component may interfere with hard segment phase out, and with the alignment of hard segments which is responsible for strength and modulus properties.

It would be desirable to prepare polyoxyalkylene ethers with exceptionally low unsaturation, close-to-nominal functionality, and low polydispersity, in a continuous process. It would also be desirable to prepare ultra-low unsaturation polyoxyalkylene polyethers in a continuous process without forming significant quantities of ultra high molecular weight fractions.

It would be further desirable to prepare polyoxyalkylene polyethers using DMC catalysts while maintaining high build ratios. It would be yet further desirable to prepare large quantities of polyether product while utilizing small quantities of activated DMC catalyst/starter mixtures. It would be still further desirable to prepare polyoxyalkylene polyethers without the use of activated starter mixtures, and to avoid the separate preparation of oligomeric starters by base catalysis.

SUMMARY OF THE INVENTION

It has now been surprisingly discovered that ultra-low unsaturation polyoxyalkylene polyethers having low polydispersity and a significantly reduced high molecular weight fraction may be prepared in a continuous process involving both continuous oxyalkylation as well as continuous addition of starter. The polyether products are exceptionally well suited for use as surfactants and in polymer forming systems, particularly polyurethanes. In a typical process in accordance with the present invention, polyol synthesis begins with introducing catalyst/starter into the continuous reactor, initiating oxyalkylation, and while oxyalkylation progresses, continuously adding catalyst, starter and alkylene oxide while continuously removing polyol product. It has also been surprisingly discovered that the subject invention process may be used to prepare large amounts of polyether product while employing small quantities of activated DMC catalyst/starter mixtures, or without using activated starter at all.

BRIEF DESCRIPTION OF THE DRAWINGS

FIG. 3b illustrates a mixing device/connector useful in the process illustrated in FIG. 3a; and FIG. 4 illustrates a further embodiment of the subject continuous process.

DETAILED DESCRIPTION OF THE INVENTION

Figure 1A:
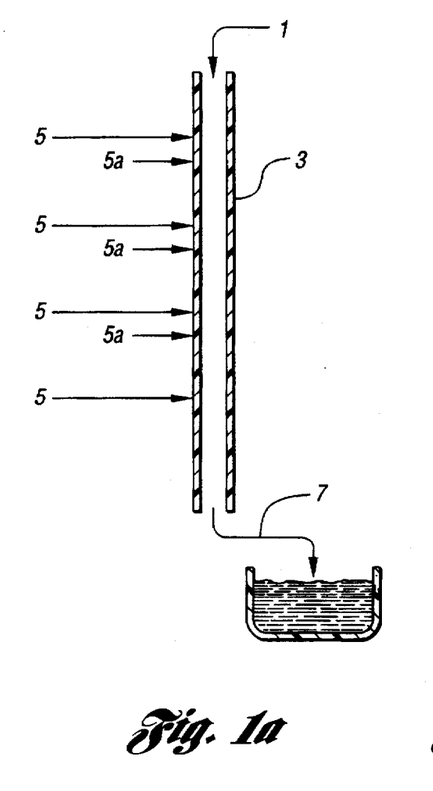
FIG. 1a is a schematic representation of one embodiment of the subject invention.
Figure 1B:
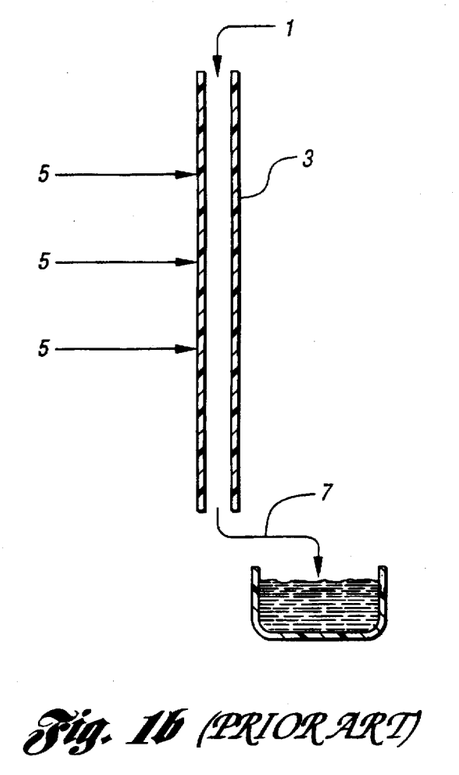
FIG. 1b is a prior art continuous oxyalkylation process.

The discussion which follows will be more readily understandable if reference is first made to FIG. 1a, which illustrates the most basic concept of the present invention, and to FIG. 1b, illustrative of the prior art as represented by East German Patent No. 203,735.

In FIG. 1b, the prior art process involved introduction at 1 of activated catalyst/starter into a continuous reactor 3. The starter is dipropylene glycol, and the "living" starter mixture is prepared by activating DMC catalyst with propylene oxide in a propylene oxide/catalyst/dipropylene glycol ratio of 500:12.3:800. Initial catalyst concentration in the catalyst/starter is thus c.a. 15,000 ppm. Alkylene oxide is added at points 5 along the reactor path, and the polyol product, e.g. a 2200 Da polyoxypropylene diol, exits the reactor at 7. The build ratio based on the molecular weight of the starter molecule is 16, but for each 1000 Kg of product, 100 Kg catalyst/starter is required, and thus the "practical" build ratio is closer to 10 due to the large quantity of activated starter required. Product catalyst residue content is very high at approximately 1500 ppm.

In FIG. 1a, a DMC catalyst/starter mixture is introduced at 1 as in the prior art process. However, in addition to alkylene oxide addition at points 5 along the reactor path, low molecular weight starter, e.g. propylene glycol (molecular weight 76 Da) is continuously introduced at points 5a. The propylene glycol may be introduced in admixture with the alkylene oxide. To prepare 1000 Kg of 2000 Da molecular weight polyol product, 20 Kg of catalyst/starter, e.g. an activated or non-activated mixture containing 1250 ppm catalyst and a 400 Da polyoxypropylene glycol may be used, one fifth the amount of the prior art process. During the reaction, 34 Kg of additional "continuously added" propylene glycol is introduced. The theoretical build ratio, based on starter molecular weight, is 26, however, the "practical" build ratio after collection of 1000 Kg product is 18.5, considerably higher than the prior art process, the final polyol product has a catalyst content of 25 ppm, and the amount of high molecular weight tail is substantially reduced. The "practical" build ratio could be much higher if a catalyst/starter mixture containing a higher concentration of catalyst such as that used in East German Patent 203,735 were utilized, which is distinctly possible. Having thus described the basic concepts, the subject invention will now be set forth in greater detail.

The catalysts useful in preparing polyoxyalkylene polyethers are catalysts exhibiting differential catalytic activity, preferably the double metal cyanide complex catalysts such as those disclosed in U.S. Pat. Nos. 3,427,334, 3,941,849, 4,477,589 and 5,158,922. Most preferred are the highly active double metal cyanide complex catalysts prepared in accordance with U.S. Pat. Nos. 5,470,813 and 5,482,908, and copending U.S. application Ser. No. 08/435,116, all of which are incorporated herein by reference.

By the term "differential catalytic activity" is meant a catalyst which exhibits a significantly higher instantaneous rate of alkylene oxide addition polymerization with respect to low molecular weight starter molecules or polyoxyalkylated oligomeric starter molecules than with high molecular weight polyoxyalkylene monols and polyols. DMC catalysts are one example of differential catalysts. Simple basic catalysts such as sodium and potassium hydroxides and alkoxides are not differential catalysts. To determine whether a particular catalyst is a differential catalyst as defined herein, the differential catalytic activity may be examined by a simple batch procedure for preparing a moderate to high molecular weight polyoxypropylene polyol. If a polyol of the target molecular weight is utilized in admixture with catalyst in an amount of c.a. 10–35 mol percent of the total moles of product while a low molecular weight, essentially monomeric starter molecule is used to synthesize the remainder of the product, and the polydispersity of the product is less than about 1.5, then the catalyst is a "differential catalyst" having "differential catalytic activity", or "differential oxyalkylation activity" as these and similar terms are defined herein.

For example, in the preparation of a 4000 Da molecular weight polyoxypropylene diol employing a zinc hexacyanocobaltate.t-butanol complex catalyst in an amount of 25 ppm based on the weight of polyol product, an activated mixture of catalyst and 4000 Da molecular weight polyoxypropylene diol in an amount of 150 g is charged to a reactor and propylene oxide containing 1.8 weight percent propylene glycol continuously added over 5 hours at 130° C. The 4000 Da molecular weight diol in the activated catalyst/starter represents about 20 mol percent of the finished product, the remaining 80% derived from oxypropylation of the added propylene glycol. The product is a c.a. 4000 Da molecular weight polyoxypropylene diol having a hydroxyl number of 29 mg KOH/g polyol, an unsaturation of 0.0049 meq/g polyol, a weight average molecular weight $M_w$ of 4600 Da, a number average molecular weight $M_n$ of 3930 Da, and therefore a polydispersity of 1.17. Thus, despite the fact that fully 20 mol percent of the product was supplied at the target weight, the polydispersity was very low, indicating a narrow molecular weight distribution. Low molecular weight species were preferentially oxyalkylated to produce this result. The catalyst is one exhibiting differential oxyalkylation activity.

When the differential catalyst is a DMC catalyst, the catalyst may or may not be activated prior to use in the subject process. Activation, when desired, involves mixing the catalyst with a starter molecule having a desired number of oxyalkylatable hydrogen atoms, and adding alkylene oxide, preferably propylene oxide or other higher alkylene oxide under pressure, and monitoring the reactor pressure. The reactor may be advantageously maintained at a temperature of from 100° C. to 120° C. A noticeable pressure drop indicates that the catalyst has been activated. The same alkylene oxide as is to be employed in continuous polyether production may be used to prepare activated catalyst, or a different alkylene oxide may be employed. With higher alkylene oxides having low vapor pressure, a volatile alkylene oxide such as ethylene oxide, oxetane, 1,2-butylene oxide, 2,3-butylene oxide, or isobutylene oxide may be employed in lieu of or in conjunction with the higher alkylene oxide to facilitate pressure monitoring. Alternatively, other methods of measuring alkylene oxide concentration (GC, GC/MS, HPLC, etc.) may be used. A noticeable reduction in free alkylene oxide concentration indicates activation.

A particularly advantageous feature of the present invention is the ability to employ "fresh" DMC catalysts without activation. DMC catalyst activation, as described in the previous paragraph, not only involves additional operator attention, thus increasing processing cost, but moreover requires a pressurized reaction vessel, increasing capital costs as well. "Fresh" catalyst is defined herein as freshly prepared, non-activated DMC catalyst, i.e. non-activated DMC catalyst in solid form or in the form of a slurry in low molecular weight starter, polyoxyalkylated low molecular weight starter, or a non-starter liquid. Most preferably, all or a substantial portion of the liquid phase of a fresh DMC catalyst mixture will comprise the same low molecular weight starter used for continuous starter addition, a polyoxyalkylated low molecular weight starter, either an intermediate takeoff product with a molecular weight less than the desired target molecular weight, or as a "heel" takeoff product wherein a portion of the polyol product itself is diverted and mixed with catalyst. The ability of the subject process to employ fresh, non-activated DMC catalyst allows for significant economies in the commercial production of polyoxyalkylene polyols, and is a preferred embodiment of the subject invention.

The amount of catalyst contained in the catalyst/starter mixture is selected in view of the process parameters and the final catalyst concentration in the polyether product. The product catalyst concentration is generally between 1 ppm and 500 ppm, more preferably between 5 ppm and 150 ppm, and most preferably between 10 ppm and 50 ppm with current DMC catalysts. The lowest catalyst concentration consistent with sufficient reaction rate is desirable, regardless of the type of catalyst employed.

The starter used to prepare the DMC catalyst/starter mixture is preferably an oligomeric starter, most preferably an oxyalkylated oligomer based on the same low molecular weight starter whose continuous addition is to be used in the continuous process. For example, where propylene glycol is to be continuously added to the reactor, a suitable oligomeric starter useful in preparing the activated catalyst/starter mixture would be a 300 Da to 1000 Da molecular weight polyoxypropylene glycol. The same oligomeric starter would be suitable for use where dipropylene glycol or water will be the continuously added starters. Where glycerine is to be continuously added starter, an oxypropylated glycerine polyol having a molecular weight of 400 Da to 1500 Da is advantageously used. However, a feature of the present process is the ability to utilize essentially monomeric starters such as ethylene glycol, propylene glycol, and the like. Thus, the starter used to prepare the catalyst/starter mixture may be the same as the continuously added starter.

The continuously added starter may be water; ethylene glycol; diethylene glycol; triethylene glycol; propylene glycol; dipropylene glycol; tripropylene glycol; 1,2-, 1,3-, and 1,4-butylene glycols; neopentyl glycol; glycerine, trimethylolpropane; triethylolpropane; pentaerythritol, α-methylglucoside; hydroxy-methyl-, hydroxyethyl-, and hydroxypropylglucosides; sorbitol, mannitol; sucrose; tetrakis [2-hydroxyethyland 2-hydroxypropyl]ethylene diamines; and other commonly used starters. Also suitable are monofunctional starters such as methanol, ethanol, 1-propanol, 2-propanol, n-butanol, 2-butanol, 2-ethylhexanol, and the like, as well as phenol, catechol, 4,4'-dihydroxybiphenyl, 4,4'-dihydroxydiphenylmethane, etc. Other suitable starters include those described in U.S. Pat. Nos. 3,900,518; 3,941,849; and 4,472,860, herein incorporated by reference.

The continuously added starter may be essentially any polyoxyalkylene polymer or copolymer or suitable initiator for the production thereof, which has a molecular weight less than the desired product weight. Thus, the molecular weight of the continuously added starter may vary between 18 Da (water) and 45,000 Da (high molecular weight polyoxyalkylene polyol). It is much preferred to use continuously added starters with molecular weight less than 1000 Da, preferably less than 500 Da, and most preferably less than 300 Da.

Once the optionally activated catalyst/starter mixture has been prepared, it is generally directed to a storage, or "surge" tank for later use. Thus, activated catalyst/starter may be made in a batch process and delivered to the surge tank, and it is possible and desirable that more than one batch be prepared and so stored. In general, the rate of catalyst/starter production is adjusted to maintain a supply of catalyst/starter at all times. Most preferably, the surge tank contains an amount of catalyst/starter which is considerably larger than the catalyst activation reactor when such is used, as by mixing together several individual batches, any batch to batch variation in catalyst activity is minimized. It should be noted that catalyst need not be activated prior to use. Activation is optional, rather than necessary, and it is not only distinctly possible, but highly preferred to merely use mixtures of catalyst dispersed in starter, recycled oligomeric or high (target) molecular weight polyol, or in a non-starter liquid for introduction into the reactor.

Other methods of catalyst activation are also suitable. For example, activated catalyst may be prepared continuously by employing staged activation reactors with catalyst, starter, and alkylene oxide entering the first reactor and mixture removed continuously, for example as an overflow stream, and introduced into a second reactor. A take-off from the second reactor may be used to supply a third reactor, etc. Use of a tubular reactor to provide catalyst activation is also possible. However, it is preferable to employ one or more batch reactors together with a larger surge tank. In this manner, catalyst activation can be unambiguously verified.

The starter molecule to be employed in catalyst activation may be the same or a different starter than used in continuous polyol production. In general, a higher molecular weight starter molecule, for example those having equivalent weights in the range of 150 Da to 1000 Da are employed. However, an advantageous feature of the subject invention is that due to the ability to prepare preactivated catalyst/starter mixtures by a batch process prior to storage in a surge tank, starters which generally require long activation periods may be employed. For example, ethylene glycol, propylene glycol, and preferably di- and tripropylene glycols may be used. The latter may also be used without activating the catalyst, as indicated previously. The term "starter" as used herein pertains to both starter continuously added to the process as well as that portion of the activated catalyst/starter which is attributable to the starter. However, "starter" should not be confused with a catalyst/starter mixture.

A further feature of the subject invention, as more fully set out below, is that a portion of the polyether product, or preferably, a portion of intermediate polyether product may be cycled back to the catalyst activation reactor and employed for catalyst activation. Thus, in the preparation of a 4000 Da polyoxpropylene diol, the 4000 Da diol product may be used to prepare activated catalyst, or may be mixed with fresh catalyst to prepare a non-activated catalyst/starter mixture. As will be seen, build ratio does not suffer appreciably when such high molecular weight starters are used in contradistinction to prior art processes where starter molecular weight directly affects the build ratio. Preferably, in the preparation of a 4000 Da diol, a 500–1000 Da intermediate diol is removed and used to prepare additional activated catalyst/starter. However, low molecular weight starter may be used as well.

The alkylene oxides useful in the present process include, but are not limited to, ethylene oxide, propylene oxide, oxetane, 1,2- and 2,3-butylene oxide, isobutylene oxide, epichlorohydrin, cyclohexene oxide, styrene oxide, and the higher alkylene oxides such as the $C_{5-30}$ α-alkylene oxides. It is generally undesirable to employ ethylene oxide alone, but mixtures of propylene oxide and ethylene oxide with high ethylene oxide content, i.e. up to about 85 mol percent, may be used effectively. Propylene oxide or mixtures of propylene oxide with ethylene oxide or another alkylene oxide are preferred. Other polymerizable monomers may be used as well, e.g. anhydrides and other monomers as disclosed in U.S. Pat. Nos. 3,404,109, 5,145,883 and 3,538,043, which are herein incorporated by reference.

The present process is unique, in that not only is the process continuous, but the process also involves continuous addition of starter. Continuous addition of starter takes place as polyoxyalkylation of initial starter proceeds, and should not be confused with the introduction of starter at the reactor inlet alone.

For example, in the prior art process as disclosed in East German Patent No. 203,735, "starter" is introduced at the inlet as an activated catalyst/starter mixture. This starter is rapidly oxyalkylated to higher molecular weight products, and thus within a short time after introduction, low molecular weight starter concentration drops to zero as molecular weight builds due to continuous addition of alkylene oxide. As there is no continued presence of minor concentrations of low molecular weight starter or its low molecular weight oxyalkylated oligomers, not only does the build ratio suffer due to complete addition of starter at the reactor inlet, but moreover, the product is expected to have a high molecular weight tail. This high molecular weight fraction may be responsible for the hazy appearance of these polyols.

Thus, the process as described in East German Patent No. 203,705 may be described as a "plug flow" process. In such processes, the initially introduced reactants flow as a substantially coherent "plug" through the reactor. The process of the subject invention is not a plug flow process, as the addition of continuously added starter is made in such a fashion that in all but an optional, terminal "finishing" stage, lower molecular weight starter is present at a concentration which is far higher than that which would be experienced when all starter is input to the inlet of a plug flow continuous reactor.

In contrast, the addition of starter in the present case is continuous in the sense that a concentration of low molecular weight starter and/or its low molecular weight oxyalkylated oligomers is maintained for a substantial portion of the total oxyalkylation. In a tubular reactor, for example, starter may be introduced separately at numerous points along the reactor, or dissolved in alkylene oxide and introduced along the length of the reactor. In a CSTR, starter is advantageously added to alkylene oxide, and may be added at numerous locations within the reactor. Low molecular weight starter need not even be present in the catalyst/starter mixture, which may employ a much higher molecular weight starter. By whatever method added, low molecular weight starter should be present for a substantial portion of oxyalkylation, preferably for about 50% of oxyalkylation, more preferably about 70% or more. Most preferably, a low molecular weight starter concentration is maintained for a portion of the oxyalkylation which is effective to reduce the proportion of high molecular weight tail in the polyol product as compared to a batch process where all starter is added at once.

It is highly unexpected and surprising that the amount of continuously added starter may be increased to very high levels without unduly broadening molecular weight distribution. The continuously added starter may represent in excess of 90 equivalent percent of total starter. In preferred embodiments, the percentage of continuously added starter may reach levels of 98 to 99+%. Despite the continuous addition of starter, polydispersity is generally below 1.7, and most often below 1.3 to 1.4. Polydispersities in the range of 1.05 to 1.20 are readily obtainable.

It has also been surprisingly discovered that the continuous addition of starter into the reactor in amounts effective to maintain the presence of a small amount of a low molecular weight fraction severely reduces or eliminates the high molecular weight tail discussed earlier. Why this is so is unknown. It is believed that despite the sluggishness exhibited by DMC catalysts when activation is attempted using small molecules, e.g. propylene glycol, glycerine, dipropylene glycol, etc., and especially water, which may cause catalyst deactivation, DMC catalysts, once activated, oxyalkylate lower molecular weight species preferentially, i.e. are differential polyoxyalkylation catalyst as that term is used herein.

Continuous introduction of starter is not useful when employing traditional basic catalysts for several reasons. First, the high molecular weight tail experienced with DMC-catalyzed oxyalkylation is not experienced in base-catalyzed oxyalkylation, where low molecular weight, rather than high molecular weight, species are problematic. Second, base catalyzed oxyalkylation proceeds at substantially the same rate for both large and small molecules, cannot preferentially oxyalkylate a lower molecular weight fraction, and thus cannot have any effect on a high molecular weight portion, even if such were a problem. Thus, by continuously adding starter, a broader and unacceptable molecular weight distribution is obtained when basic catalysts are used. Despite the deleterious effects on polydispersity, in U.S. Pat. No. 5,114,619, a process involving addition of water to a barium or strontium oxide or hydroxide catalyzed system is used to reduce polyol unsaturation. However, potential starters other than water, e.g. low molecular weight diols, triols, and oligomeric polyoxyalkylene glycols apparently have no effect. With DMC catalysts, particularly those disclosed in U.S. Pat. Nos. 5,470,813 and 5,482,908, polyol unsaturation is not a problem; the polyol products are already of exceptionally low unsaturation, i.e. 0.004 to 0.007 meq/g, and thus one would not be motivated to add starter continuously to further lower unsaturation. Thus far, moreover, continuous addition of water does not appear to lower unsaturation when DMC catalysts are employed.

In the present process, it is desirable to have a small concentration of starter present in the reaction mixture at all times, although a final "cook out" to facilitate complete reaction of alkylene oxide may be performed without starter present. It has been surprisingly discovered that continuous addition of as little as 1–2 equivalent percent of starter relative to total product weight is effective to substantially eliminate the high molecular weight tail common in DMC-catalyzed polyethers. In a less preferred embodiment, the continuously added starter is added during the initial portion of the total oxyalkylation. However, despite the continuous addition of this very significant, and in most cases, major amount of low molecular weight starter, the molecular weight distribution is not significantly broadened and products of very low polydispersity are easily obtained.

The ability to employ low molecular weight starter is a distinct advantage over the use of oligomeric starters prepared by a previous oxyalkylation. In particular, the build ratio is increased markedly. In addition, the economies allowed by elimination of a separate oxyalkylation process followed by catalyst removal from the oligomeric starter thus prepared are realized. No continuous, DMC-catalyzed process employing continuous addition of starter has been proposed. U.S. Pat. No. 3,404,109 disclosed a DMC catalyzed batch process where the entire alkylene oxide charge was added to a reactor and water added in several increments. However, batch processes and continuous processes are quite distinct and cannot be equated. No references describe a process where catalyst, starter and alkylene oxide are charged continuously, maintaining a small but finite starter concentration, with continuous product removal.

The continuous process begins with establishing oxyalkylation conditions in a continuous reactor. By the phrase "establishing in a continuous reactor a first portion of a DMC catalyst/initial starter mixture effective to initiate polyoxyalkylation of said initial starter after introduction of alkylene oxide into the continuous reactor" is merely meant that oxyalkylation conditions are established at some point in time. For example, an initial establishing of oxyalkylation conditions does not need repeating. Following establishment of oxyalkylation conditions, only the addition of alkylene oxide, continuously added starter, and further catalyst need be maintained, and the claims should be interpreted with this mode of operation in mind. Quite evidently, if oxyalkylation conditions are not established, oxyalkylation cannot take place.

Moreover, the term "starter" as employed in the phrase "DMC catalyst/initial starter" refers to an oxyalkylatable molecule of any molecular weight. This oxyalkylatable molecule may be a low molecular weight starter molecule having a molecular weight below about 300 Da, e.g. propylene glycol, dipropylene glycol, glycerine, a three mole oxypropylate of glycerine, etc., or may be a much higher molecular weight molecule, for example the product of desired product molecular weight.

The subject process may be further described with reference to FIG. 2, which illustrates schematically one embodiment of the subject invention. Continuous reactor 21 is a pressure reactor made of conventional material, i.e. a glass lined or stainless steel reactor. A continuous-flow stirred-tank reactor (CSTR) is suitable, for example. Catalyst is activated in batch activation reactor 23, as described in greater detail in the remainder of the specification, particularly the examples, and is then transferred to activated catalyst/starter surge tank 25. From surge tank 25, a metered amount of catalyst/starter is introduced into the reactor through line 27, while alkylene oxide, together with additional starter is fed to the reactor through line 29. The alkylene oxide/starter feed may be propylene oxide containing 1.6 weight percent propylene glycol or 0.5 weight percent water, for example. Mixtures of starters, e.g. water, propylene glycol, glycerine, sorbitol, etc. may be employed. All the continuously added starter may be added in admixture with the alkylene oxide, or the starter may be metered into the reactor in a separate stream. When two or more starters are used and one is not appreciably soluble in alkylene oxide, it may be dissolved in another starter or an inert solvent such as toluene and introduced separately into the reactor. Fairly large proportions of continuously added starter dissolved in solvent or alkylene oxide may be used. For example, it is possible to use propylene oxide containing 7–8 weight percent glycerine, or more.

From the reactor, the product polyol flows through line 31 to filter 33 and from there through line 35 to product holding tank 37. In some cases, using relatively small amounts of highly active catalyst, the filtration step may not be necessary, or the filtration may be a fast, coarse filtration. The reactor product effluent flowing through line 31 may be diverted to a second reactor prior to filtration. The second reactor may be used to fully "cook out" alkylene oxide or may be used to cap the product with a different alkylene oxide or mixture of alkylene oxides. If a significant amount of DMC-catalyzed oxyalkylation is to take place in the second reactor, it is preferable that starter also be fed to this reactor to eliminate the potential for formation of very high molecular weight byproducts. For startup, the reactor may be initially charged with a heel of a prior batch, an inert solvent, or finished polyol. If inert solvent is employed, it is preferably stripped from the product.

Figure 2:
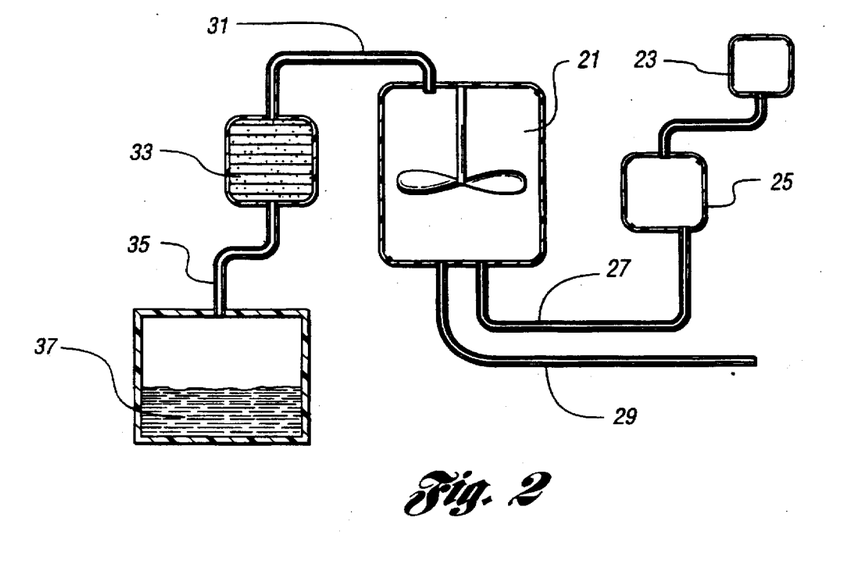
FIG. 2 illustrates one embodiment of a continuous process in accordance with the subject invention.
Figure 3A:
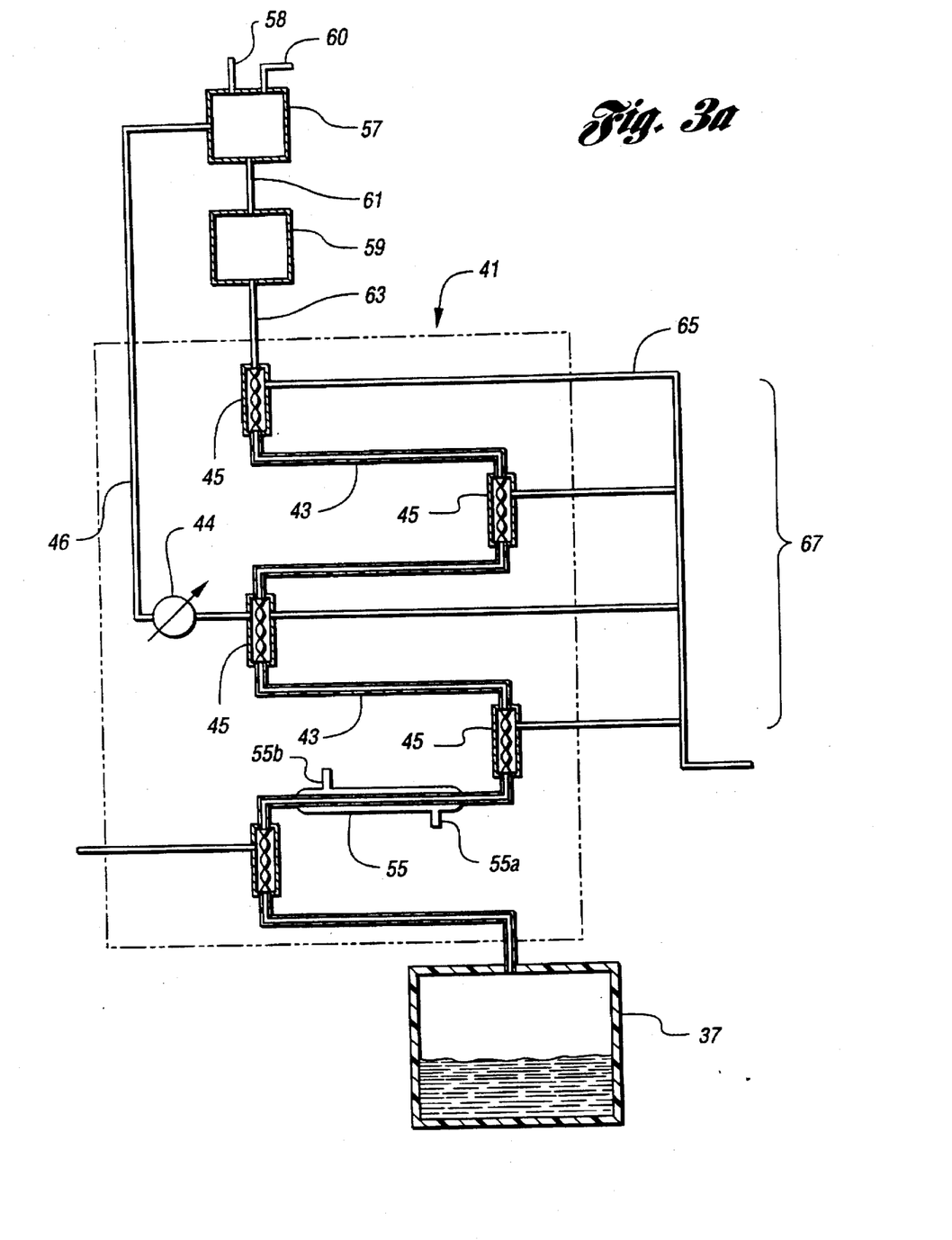
FIG. 3a illustrates another embodiment of a continuous process in accordance with the subject invention.
Figures 3B, 4:
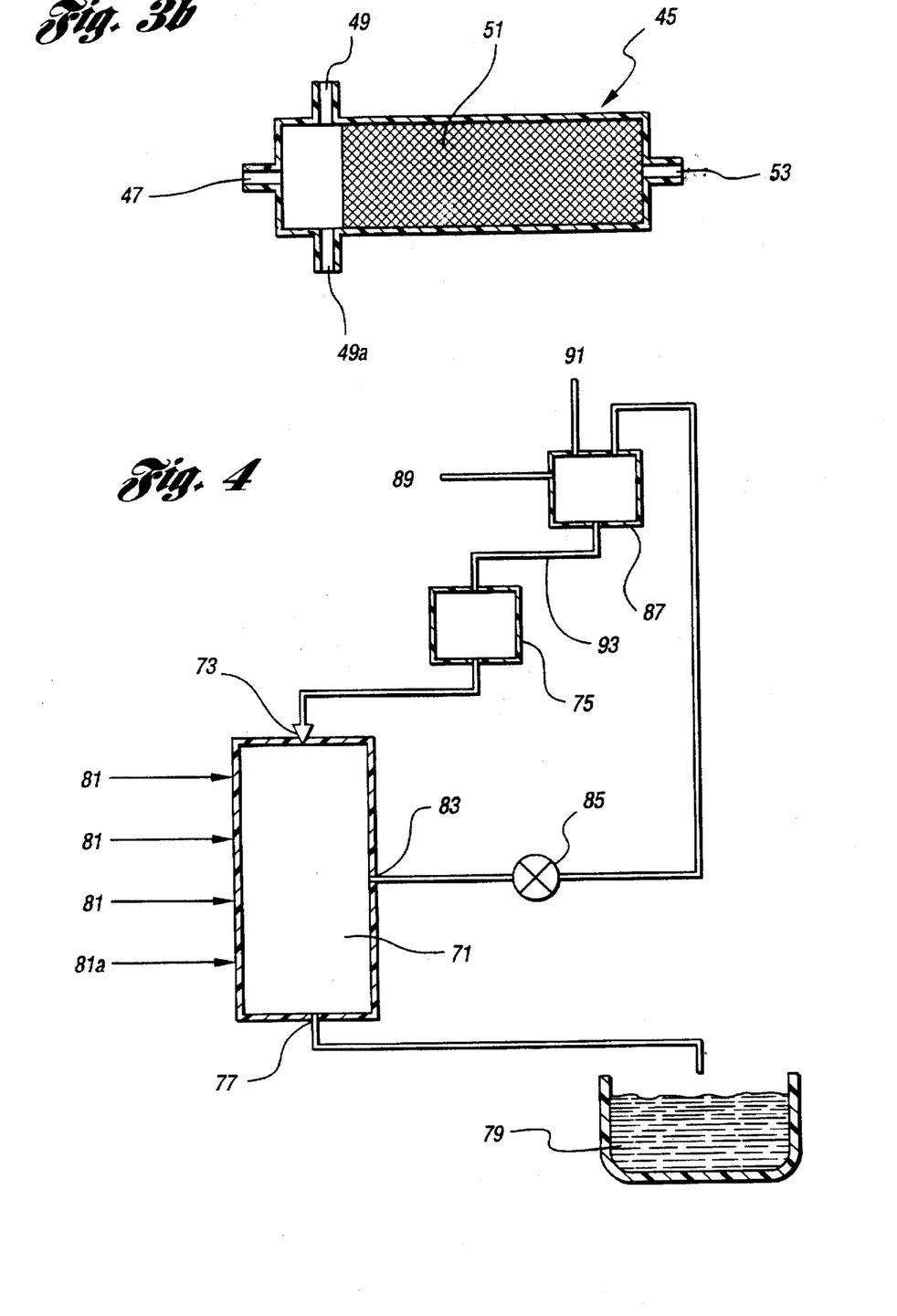

The continuous process illustrated by FIG. 2 has the advantages of simplicity with some degree of flexibility. However, if block or block/random polyethers are to be produced, at least two reactors must be used. The process has a disadvantage in that large pressure reactors are expensive and thus require significant capital investment. A preferred embodiment of the subject invention is illustrated in FIG. 3a. In FIG. 3a, tubular reactor 41 is composed of non-reactive metal tubes 43 connected to each other with connector/addition/mixer devices 45. A schematic enlargement of one type of device 45 is shown in FIG. 3b. In FIG. 3b, at 47, is the inlet port from the previous reactor tube, while at 49 is the inlet for alkylene oxide/starter mixture. Shown at 49a is an optional port for addition of a different alkylene oxide/starter mixture or starter alone. At 51 are the vanes of a static mixer, and at 53 is the outlet to the next tubular reactor section. Static mixers are well known, and should provide adequate mixing so long as fluid velocity is relatively high. Where mixing is inadequate, the static mixer portion of device 45 may be replaced with or augmented by a mechanical mixer, for example an impeller type or rotor/stator type. Any mixing device or combination which provides for efficient mixing of the polyol stream and alkylene oxide streams entering device 45 may be used.

It is, of course, possible to separate device 45 into its functional components and insert these into the reaction path individually. For example, alkylene oxide/starter addition may be simply through the side walls of the reactor tube with the static or other mixers interspersed at intervals. If fluid velocity is high enough to cause turbulent flow, mixing devices may be dispensed with. Alternatively, the interior walls of the tubular reactor may be roughened, equipped with fins, baffles, etc., to provide the necessary mixing.

The tubular reactors 43 may be air cooled, but are preferably surrounded by a cooling jacket. One such jacket is shown at 55, with cooling fluid inlet 55a and outlet 55b. An advantage to the use of tubular reactors is the increased cooling capacity offered. Reactor vessels, on the other hand, are difficult to cool effectively when considerable reaction heat is generated. Use of DMC catalysts such as those disclosed in U.S. Pat. Nos. 5,470,813 and 5,482,908 has been hampered by the inability to cool the reactor sufficiently to provide for the highest possible throughput. The tubular reactor may also be located within a larger cooling vessel holding water or other heat transfer fluid. Water under pressure may be used, for example. Heat generated may be used to prepare steam for use in other processes or for power generation.

In FIG. 3a, an initial, activated catalyst/starter mixture is prepared in activation reactor 57, transferred to surge tank 59 through line 61, and ultimately flows through line 63 to the first connector/mixer device 45. In this mixer, the activated catalyst/starer is admixed with alkylene oxide containing additional starter, supplied through line 65 of manifold 67. Manifold 67 also supplies alkylene oxide/starter to the remaining mixing devices 45, or to other points along the tubular reactor as discussed.

The activated catalyst starter mixture may be replenished by cycling a takeoff stream of intermediate molecular weight product to the catalyst activation reactor 57 through valve 44 and line 46, thus avoiding separate synthesis of oligomeric catalyst activation starter. The activation reactor receives fresh DMC catalyst through inlet 58 and alkylene oxide for activation through line 60. In a most preferred embodiment, catalyst is not activated and activation reactor 57 may be replaced by a simple mix tank with an inlet suitable for introduction of dry catalyst or catalyst slurry, but without an alkylene oxide inlet. Alternatively, the activation reactor may be eliminated in its entirety and the intermediate product takeoff routed directly to surge tank 59, into which inlet for fresh catalyst is also directed. Although line 46 and valve 44 are shown at an intermediate position along the tubular reactor, product takeoff may also be from the end of the reactor or from storage tank 37. Takeoff may be continuous or intermittent.

Following contact of activated catalyst/starter and alkylene oxide/starter in the first portion of the tubular reactor, oxyalkylation occurs rapidly, consuming alkylene oxide and building polyol weight. The starter introduced with the alkylene oxide is oxyalkylated also, but at a higher rate, so that by the time the entire length of reactor has been traversed, polydispersity is surprisingly low. Additional alkylene oxide/starter mixture enters at multitudinous points along the reactor path and are rapidly consumed. Subsequent injections of alkylene oxide/starter may employ the same alkylene oxide(s) and/or starter(s) or different ones. While a mixture of alkylene oxide/starter may be introduced into the final reactor segment, it may be desirable to introduce only alkylene oxide, to ensure that the content of low molecular weight products is minimized. By changing the alkylene oxide at points along the reaction path, block, and block/random polyether polyols may be prepared.

It is noteworthy, that the present process, due to the supply of low molecular weight starter in a continuous fashion, in effect utilizes the low molecular weight starters themselves to produce polyols rather than relying on large quantities of oligomeric starters. When attempts are made to use low molecular weight starters such as water, propylene glycol, glycerine, etc., with DMC-catalysts as such, results are extremely erratic, the best results being characterized by a very long induction period followed by a rather sluggish reaction in the early stages, the worst results being catalyst deactivation. Product properties, as one might expect, tend to be erratic also. However, the present invention enables such low molecular weight starters to be routinely used, even for the initial start-up. Product cost is reduced as a result, and product quality increased.

The term "continuous" as used herein may be defined as a mode of addition of a relevant catalyst or reactant in such manner so as to maintain an effective concentration of the catalyst or reactant substantially continuously. Catalyst input, for example, may be truly continuous, or may be in relatively closely spaced increments. Likewise, continuous starter addition may be truly continuous, or may be incremental. It would not detract from the present process to incrementally add a catalyst or reactant in such a manner that the added materials concentration decreases to essentially zero for some time prior to the next incremental addition. However, it is preferably that catalyst concentration be maintained at substantially the same level during the major-ity of the course of the continuous reaction, and that low molecular weight starter be present during the majority of the process. Incremental addition of catalyst and/or reactant which does not substantially affect the nature of the product is still "continuous" as that term is used herein. It is feasible, for example, to provide a recycle loop where a portion of the reacting mixture is back fed to a prior point in the process, thus smoothing out any discontinuities brought about by incremental additions.

Perhaps the greatest benefit of the subject invention process may be illustrated with reference to FIG. 4. In FIG. 4, the reactor 71 may be a CSTR, tubular reactor, or other continuous reactor having inlet 73 into which activated catalyst/starter flows from surge tank 75 and from which polyol product flows from outlet 77 to polyol storage tank 79. Reactor inlets 81 supply alkylene oxide and starter to the reactor. At 83 is a takeoff line whose flow is governed by valve 85. In this case, the takeoff is positioned near the middle of the reactor path, although it is possible to position the takeoff nearer the inlet 73, outlet 77, or even from the polyol storage tank 79. The takeoff line supplies polyol to catalyst/starter activation vessel 87. Vessel 87 is also equipped with inlets or charging ports 89, for alkylene oxide, and 91, for DMC catalyst. An outlet line 93 connects the catalyst/starter activation vessel with the activated catalyst/starter surge tank. As was the case with FIG. 3a, the catalyst activation vessel may be dispensed with when non-activated catalyst is used.

In operation, the reactor is initially filled with pre-prepared polyol or inert solvent, or in some instances, may be started "dry." Activated catalyst/starter, e.g. a 900 Da molecular weight oxypropylated glycerine polyol mixed with DMC-catalyst and activated with propylene oxide as described hereafter, flows from surge tank 75 to reactor 71. The reactor is heated to a suitable oxyalkylation temperature in the range of 40° C. to 180° C., preferably 70° C. to 140° C., for example, and a mixed feed of propylene oxide containing glycerine is fed into reactor feed inlets 81. As the activated catalyst/starter, propylene oxide, and additional starter flow through the reactor, the polyoxyalkylation increases the molecular weight of the starter molecules to produce a polyoxypropylene triol, which exits the reactor into polyol storage tank 79. The final reactor feed 81a may contain starter as well, but is preferably all propylene oxide, a mixture of propylene oxide and another alkylene oxide, e.g. ethylene oxide, or a mixture of a higher alkylene oxide other than propylene oxide and another alkylene oxide.

The takeoff 83 is advantageously located about one-third to one-half the length of the reactor, or at another location such that a "takeoff polyol" of intermediate molecular weight is removed from the reactor. For example, for a 6000 Da molecular weight triol product, the intermediate "takeoff polyol" may advantageously have a molecular weight of between 900 Da and 2000 Da. The intermediate, "takeoff polyol" is introduced into catalyst/starter activation reactor 87, fresh DMC catalyst added, and alkylene oxide added until the catalyst is activated. The activated catalyst/starter mixture then flows to surge tank 75 for later introduction into reactor inlet 73.

However, the take-off may also be at the outlet of the reactor, thus recycling a "take-off polyol" whose molecular weight is substantially that of the finished product, or may be near the inlet, thus being of very low molecular weight. Surprisingly, the process may be operated without use of any oligomeric or higher molecular weight starter. Monomeric, low molecular weight starter molecules, e.g., the same molecules as used for continuously added starter, may be added in lieu of recycle. The take-off may also be intermittent, i.e. "batchwise," removing only enough polyol to prepare the next batch of activated catalyst.

Thus, the initial, activated catalyst/starter may advantageously use a "presynthesized" starter molecule of moderate molecular weight, i.e. a potassium hydroxide catalyzed oxypropylated glycerine starter from which traces of basic catalyst are scrupulously removed. However, once the process begins, the process generates its own moderate molecular weight starter molecules by the oxyalkylation of the glycerine co-fed with alkylene oxide. Thus, over time, the build ratio of the process approaches the ratio of product molecular weight to low molecular weight starter molecular weight even when a moderate to high molecular weight starter is desired for catalyst activation. For example, in the production of a 6000 Da molecular weight glycerine initiated triol, the maximum theoretical build ratio is $M_{polyol}/M_{glycerine}$, or 6000 Da/92 Da=65.2.

In a batch process, beginning with an activated, 900 Da starter/catalyst mixture, the build ratio will be 6000 Da/900 Da=6.67. In the subject, continuous process, assuming 100 Kg catalyst/starter is used during the first hour, in which the amount used is completely replaced with newly produced starter derived from the product itself, and assuming 1200 Kg polyol is produced, the build ratio is approximately 12 over this time period. However, during the next nine hours, no new 900 Da starter is introduced, as the process now supplies its own starter. At 1200 Kg polyol/hour output, 18.4 Kg glycerine will be continuously input along with the alkylene oxide. Thus, after two hours running, total starter will be c.a. 118 Kg, and total polyol produced 2400 Kg, for a build ratio of 20.3. After ten hours, total starter consumed will be roughly 100 Kg+9×(18.4 Kg)=265 Kg, and polyol output will be 12,000 Kg, a build ratio of 45.2. After 24 hours of continuous operation, the build ratio will already be 53.1, 81% of theoretical. After 3 days of running, the build ratio will be 60.6, 93% of theoretical, and 86,400 Kg of polyol will have been produced, consuming only 100 Kg of 900 Da molecular weight initial starter, and 1,325 Kg glycerine.

For continuous processes for DMC catalyzed oxyalkylation, the "continuous build ratio" may be defined as the quotient of the "actual build ratio" and the "theoretical build ratio." The "theoretical build ratio" is the ratio of number average polyol product molecular weight to "idealized starter" molecular weight. The "idealized starter" is the residue which would remain after all oxyalkylene moieties are stripped away from the product molecules leaving a molecule with no remaining oxyalkylene moieties. For example, consider a polyol having the structure:

where (A—O) represents an oxyalkylene moiety which may be the same or different, and n represents an integer greater than 1, which may be the same or different. If n averages 40, and (A—O) represents an oxypropylene group, then the polyol is a c.a. 6000 Da polyoxypropylene triol. Removing all the (A—O) groups would arrive at the "idealized starter," glycerine. The same polyol could be prepared by oxyalkylating glycerine, or by further oxyalkylating a previously oxyalkylated glycerine oligomer. Both methods of producing the subject polyol would yield the same "idealized starter" rather than the starter which is contained in the activated catalyst/starter mixture, which, for the latter case, might be a 900 Da glycerine-initiated triol.

Likewise, a polyol having the structure and having a 4000 Da molecular weight would have propylene glycol as its "idealized starter" regardless of whether the actual starter present in the activated catalyst/starter mixture used in the synthesis were propylene glycol, dipropylene glycol, tripropylene glycol, or a 1000 Da polyoxypropylene glycol.

The theoretical build ratio for a 6000 Da triol having the generalized structure I is thus 65.2, while a 10,000 Da triol having the same generalized structure would have a theoretical build ratio of 108.7. For a 2000 Da diol having the generalized structure II, the theoretical build ratio is 26.3, while a 10,000 Da molecular weight diol of the same generalized structure will have a theoretical build ratio of 131.6.

The "actual build ratio" is determined by dividing the weight of polyol product produced by the sum of the weights of oligomeric starter added in the initial activated catalyst/starter mixture, i.e. the weight of starter input to, as opposed to having been derived from, the process, and the weight of monomeric starter supplied during the process. For example, where 100 Kg of activated catalyst/starter mixture is initially supplied, and 1000 Kg of monomeric starter, i.e. glycerine, added during the course of the product run, the sum of starter weights is 1100 Kg. If 66,000 Kg of a 6000 Da polyoxyalkylene triol is produced during the run, the actual build ratio will be 66,000 Kg÷1100 Kg, or 60. The "continuous build ratio," the ratio of actual build ratio (60) to theoretical build ratio (65.2 for a glycerine idealized starter, 6000 Da triol), will be 0.92. Continuous build ratios of greater than 0.70 are preferred, more preferably greater than 0.80, yet more preferably greater than 0.90, and most preferably in the range of 0.95 to <1.00. Continuous build ratios of these magnitudes have not previously been achieved in any continuously, DMC-catalyzed polyoxyalkylation process.

In a less preferred embodiment of the subject invention, the continuously added starter is added in but one or a small number of addition ports during substantially the initial portion of total reactor residence time. For example, in a tubular reactor where activated catalyst/starter is supplied to an inlet and alkylene oxide supplied along the length of the reactor, one or a small number of starter addition ports located along the first one-third or one-half of the reactor may supply all the starter, preferably admixed with alkylene oxide. In such a case, the polyol product may contain some very high molecular weight product since no new starter will be introduced over the last two-thirds or one-half of total residence time. However, the amount of high molecular weight fraction will be considerably reduced as compared to a process where no new starter is added, and the process will also exhibit a much higher build ratio than a process where total starter is supplied as a component of the activated catalyst/starter mixture.

Having generally described this invention, a further understanding can be obtained by reference to certain specific examples which are provided herein for purposes of illustration only and are not intended to be limiting unless otherwise specified.

EXAMPLE 1

Catalyst/Starter Activation

A one-liter stirred reactor is charged with polyoxypropylene triol (700 Da mol. wt.) starter (70 g) and double metal cyanide complex catalyst (0.057 g, 100 ppm level in finished polyol). The mixture is stirred and heated to 105° C., and is stripped under vacuum to remove traces of water from the triol starter. The reactor pressure is adjusted to a vacuum of about 30 in. (Hg), and propylene oxide (10–11 g) is added in one portion. A noticeable drop in reactor pressure indicates that the catalyst has been activated.

The activated catalyst/starter mixture is used as such or is transferred to a surge tank, preferably through a dedicated connection line to avoid contamination. A dry nitrogen or inert gas blanket is maintained in the surge tank to prevent catalyst contamination and/or deactivation. Suitable catalysts are those described in U.S. Pat. Nos. 5,470,813 and 5,482,908.

Unless specified otherwise, the term "starter" as used in the claims includes the use of a plurality of different starters. The term "combined starters" includes, generally, the "initial" starter supplied as a component of the initially established activated catalyst/starter mixture, subsequently added activated catalyst/"further" starter which may be the same or different from the activated catalyst/"initial" starter; and "continuously added" starter, i.e. the sum of all starter molecules present from whatever source derived. It is expected that following startup, "initial" starter, present as a component of the activated catalyst/initial starter, will rapidly decline in amount, and will not be present in the total starter for the majority of a continuous run. By the terms "continuously", "continuously adding" and like terms is meant a mode of addition which results in the substantially continuous presence of the species in question. Addition may be truly continuous or may be in spaced increments which achieve substantially the same result. By the term "continuous reactor" is meant any reactor configuration employing continuous takeoff of product, as conventionally understood by those versed in reactor technology.

In the following Examples, a one liter stainless steel autoclave was modified to operate as a continuous stirred tank reactor (CSTR) to synthesize polyols using a differential polyoxyalkylation catalyst. Two separate feed lines into the reactor were employed, one for monomer (alkylene oxide) and one for catalyst/starter, each having separate pump and inlet to the reactor. The heat of reaction of the exothermic polyoxyalkylation is removed by an internal cooling coil. A level control, connected to a pump, is used to a maintain a constant residence time in the reactor. The outlet of the reactor is pumped into a second vessel where any residual monomer is stripped prior to analysis A series of continuous process runs were conducted using this reactor system as follows.

EXAMPLE 2

The apparatus previously described is utilized to prepare a 4000 Da polyoxypropylene diol. A monomer feed tank is charged with propylene oxide containing 0.6 weight percent propylene glycol. The catalyst feed consists of 180 ppm DMC catalyst dispersed in a 1000 Da molecular weight polyoxypropylene diol made previously in a semi-batch reactor using DMC catalysts. The CSTR reactor is first charged with approximately 10% of the total 1000 Da diol/catalyst mixture, and heated to 130° C. An initial charge of propylene oxide is added to the reactor to verify catalyst activity. Following confirmation that the catalyst is active, monomer and catalyst feed pumps are started, introducing the monomer and catalyst feeds to the CSTR, and the level control turned on. Feed rates are adjusted so as to maintain a 100 minute residence time in the reactor. The ratio of starter (propylene glycol plus 1000 Da diol) to monomer (propylene oxide) is adjusted to produce a 4000 Da polyoxypropylene diol product. After lining out the system for 9 residence times at 130° C., a 4000 Da diol is produced with the following properties: hydroxyl number =28, viscosity= 980 cPs, polydispersity=1.12, and unsaturation=0.0046 meq/g.

EXAMPLE 3

Using the same reactor system and conditions (temperature, residence time) described in Example 2, another 4000 Da molecular weight polyoxypropylene diol is synthesized without catalyst preactivation. A 1000 Da polyoxypropylene diol synthesized using conventional KOH catalysts replaces the DMC catalyzed 1000 Da diol of the prior example. Prior to introduction into the reactor, traces of KOH catalyst are removed by traditional polyol purification methods so as to avoid poisoning the DMC catalyst. To this 1000 Da polyoxypropylene diol is added 180 ppm fresh, i.e. non-activated, DMC catalyst as a slurry. The reactor feeds are turned on without any activation procedure and the system lined out for 5 residence times. The resulting 4000 Da molecular weight polyoxypropylene diol has the following properties: hydroxyl number=27.2, viscosity =1011 cPs, polydispersity=1.12, and unsaturation=0.0052 meq/g. This example illustrates that the process of the subject invention is operable without catalyst activation.

EXAMPLE 4

Using the same reactor system and conditions described in Example 2, the 1000 Da polyoxypropylene diol is replaced with a 4000 Da polyoxypropylene diol produced in Example 3. Fresh, unactivated DMC catalyst (180 ppm) is slurried in the 4000 Da diol and the ratio of propylene oxide to starter (propylene glycol) adjusted to compensate for the fact that the 1000 Da diol has been replaced with the 4000 Da diol. The system is operated at 130° C. and the residence time varies from 50 minutes to 315 minutes. In all cases, a nominal 4000 Da diol is produced with the following properties: hydroxyl number=28, viscosity=950–980 cPs, polydispersity =1.12, and unsaturation=0.0065 meq/g. This example illustrates that the product of the continuous process may be employed to introduce the catalyst slurry without any substantial effect on product molecular weight or polydispersity. The use of the product polyol in this manner may be termed a "heel" process.

EXAMPLE 5

Using the reactor system and conditions described in Example 2, and the 4000 Da polyoxypropylene diol/DMC catalyst slurry described in Example 4, the system is operated at a 100 minute residence time with temperature varying from 110° C. to 150° C. In all cases, a nominal 4000 Da diol is produced with a hydroxyl number=28, viscosity= 950–980 cPs, polydispersity=1.12, and unsaturation= 0.005–0.008 meq/g. This example illustrates that a relatively wide temperature range may be utilized in the continuous process of the subject invention.

EXAMPLE 6

Using the reactor system and conditions (temperature, residence time) described in Example 2, a 3000 Da polyoxypropylene triol synthesized using a DMC catalyst replaces the 1000 Da polyoxypropylene diol of Example 2. Furthermore, instead of activated catalyst, 180 ppm of fresh DMC catalyst is slurried into the 3000 Da triol. The propylene glycol starter of Example 2 is replaced by glycerine. The ratio of propylene oxide to starter (glycerine) is adjusted to produce a 3000 Da polyoxypropylated, glycerine-initiated triol. The feed pumps are turned on, as in the previous examples, without any catalyst activation procedure, and the system lined out for 13 residence times. The resulting nominal 3000 Da molecular weight triol had the following properties: hydroxyl number=55, viscosity=650 cPs, polydispersity=1.14, and unsaturation=0.0043 meq/g.

EXAMPLE 7

Using the reactor system and conditions (temperature, residence time) described in Example 6, a DMC catalyst is slurried in 3000 Da molecular weight polyoxypropylene triol, and the monomer feed is changed from propylene oxide to a mixture consisting of 88 weight percent propylene oxide and 12 weight percent ethylene oxide. Again, the monomer/glycerine ratio is adjusted to produce a 3000 Da triol and the feed is begun without any catalyst activation procedure. The resulting 3000 molecular weight polyoxypropylene/polyoxyethylene copolymer triol has the following properties: hydroxyl number=55, viscosity= 600–630 cPs, polydispersity=1.15, and unsaturation=0.0061 meq/g.

Having now fully described the invention, it will be apparent to one of ordinary skill in the art that many changes and modifications can be made thereto without departing from the spirit or scope of the invention as set forth herein.

What is claimed is:

1. A continuous process for the preparation of a polyoxyalkylene polyether product of number average molecular weight N employing continuous addition of starter, comprising:

a) establishing in a continuous reactor a first portion of a DMC catalyst/initial starter mixture effective initiate polyoxyalkylation of said initial starter after introduction of alkylene oxide into said continuous reactor;

b) continuously introducing into said continuous reactor one or more alkylene oxides;

c) continuously introducing into said continuous reactor one or more continuously added starters which may be the same or different than said initial starter;

d) continuously introducing into said reactor fresh DMC catalyst and/or further DMC catalyst/further starter mixture such that the catalytic activity is maintained;

e) polyoxyalkylating combined starters by continuously practicing at least steps b) through d) herein until a polyoxyalkylene polyether product of number average molecular weight N is obtained; and f) continuously removing said polyoxyalkylene polyether product from said continuous reactor.

2. The process of claim 1 wherein the DMC catalyst/initial starter mixture is an activated DMC catalyst/initial starter mixture prepared by mixing together a solid DMC catalyst, a starter molecule having an equivalent weight of from about 76 Da to about 4000 Da to form a catalyst/starter mixture, and contacting said catalyst/starter mixture with one or more alkylene oxides until an activated catalyst/starter mixture is obtained.

3. The process of claim 1 wherein all or a portion of said DMC catalyst has not been activated prior to introduction into said reactor.

4. The process of claim 3 wherein fresh DMC catalyst is mixed with a portion of said polyoxyalkylene polyether product of molecular weight N and/or with a polyoxyalkylene polyether intermediate product of less than said molecular weight N to form a DMC catalyst mixture, and introducing said DMC catalyst mixture into said reactor without first activating said DMC catalyst prior to said introducing into said reactor.

5. The process of claim 1 wherein said catalyst/initial starter mixture and/or further catalyst/further starter mixture are stored in one or more surge tank(s) and continuously metered from said surge tank(s) into an inlet of said continuous reactor.

6. The process of claim 1 wherein a portion of polyoxyalkylene polyether produced by polyoxyalkylation of said combined starters is withdrawn from said continuous reactor and used to prepare additional further catalyst/further starter, said additional further catalyst/further starter introduced into an inlet of said continuous reactor.

7. The process of claim 6 wherein said additional further catalyst/further starter is first introduced into a surge tank connected to an inlet of said continuous reactor.

8. The process of claim 1 wherein said alkylene oxide(s) are admixed with said continuously added starter to form an alkylene oxide/starter mixture prior to introducing into said reactor.

9. The process of claim 1 wherein at a point prior to removal of said polyoxyalkylene polyether product, alkylene oxide b) is introduced into said reactor without addition of further continuously added starter.

10. The process of claim 1 wherein said reactor is a continuous stirred tank reactor vessel.

11. The process of claim 1 wherein said reactor is a tubular reactor.

12. The process of claim 11 wherein said tubular reactor comprises a connected series of tubular elements having positioned along the length thereof a plurality of addition ports suitable for introducing alkylene oxide and/or starter into said reactor, and a plurality of mixing devices.

13. The process of claim 12 wherein one or more of said mixing devices comprise static mixer(s).

14. A continuous process for the preparation of a polyoxyalkylene polyether product by DMC-catalyzed polyoxyalkylation, comprising:

a) introducing into a reactor a DMC catalyst/starter mixture;

b) continuously introducing alkylene oxide into said reactor;

c) continuously introducing continuously added starter into said reactor, wherein said starter contained in said DMC catalyst/starter mixture and said continuously added starter may be the same or different; and d) continuously withdrawing a polyoxyalkylene polyether product having a number average molecular weight of N Daltons where N is from about 500 to about 50,000;

wherein the continuous build ratio of said continuous process is greater than 0.70.

15. The process of claim 14 wherein said continuous build ratio is greater than 0.80.

16. The process of claim 14 wherein said continuous build ratio is greater than 0.90.

17. The process of claim 14 further comprising:

e) withdrawing from said reactor a takeoff polyoxyalkylene polyether having a number average molecular weight of N or less;

f) mixing said takeoff polyoxyalkylene polyether with fresh DMC catalyst to prepare a DMC catalyst/takeoff polyoxyalkylene polyether mixture; and g) employing said DMC catalyst/takeoff polyoxyalkylene polyether mixture as at least a portion of said DMC catalyst/starter introduced into said reactor in step a).

18. The process of claim 17 wherein said DMC catalyst/takeoff polyoxyalkylene polyether is activated by contacting with alkylene oxide to prepare an activated DMC/catalyst takeoff polyoxyalkylene polyether mixture.

19. The process of claim 18 wherein said takeoff polyoxyalkylene polyether has a number average molecular weight greater than 100 Da and less than 2N/3.

20. The process of claim 18 wherein N is greater than 1500 and where said takeoff polyoxyalkylene polyether has a number average molecular weight greater than about 300 Da and less than about N/2.

21. The process of claim 14 wherein following said continuously introducing of alkylene oxide (b) and said continuously introducing of starter (c), and prior to said continuously withdrawing (d), alkylene oxide is introduced into said reactor and reacted for sufficient time to substantially eliminate lower molecular weight polyoxyalkylene polyether fractions of said polyoxyalkylene polyether product.

22. The process of claim 1 wherein during at least the first 70% of the average residence time of polyoxyalkylene polyether and alkylene oxide in said reactor, a low molecular weight fraction having a number average molecular weight between about 18 and about 500 Da is present in said reactor.

23. The process of claim 14 wherein for at least 70% of an average transit in said reactor, the reactor contents comprise about 1 equivalent percent or more of a low molecular weight fraction comprised of starter molecules and oxyalkylated starter molecules having molecular weights of less than about N/3.

24. A continuous process for the DMC catalyzed preparation of polyoxyalkylene polyethers, comprising:

a) introducing into a continuous reactor an effective polyoxyalkylation catalyzing amount of at least one DMC catalyst;

b) continuously introducing into said reactor one or more alkylene oxides;

c) continuously introducing into said reactor further DMC catalyst;

d) continuously introducing into said reactor one or more continuously added starter molecules, said continuously added starter molecules having an average molecular weight of from about 18 Da to 45,000 Da, such that a concentration of continuously added starter molecules is maintained for about 50 percent or more of the average residence time of said reactor;

e) continuously withdrawing a polyoxyalkylene polyether product having an equivalent weight in excess of 1000 Da.

25. The process of claim 24 wherein said continuously added starter is supplied in admixture with said one or more alkylene oxides.

26. The process of claim 24 wherein said concentration of said continuously added starter averages greater than 0.5 equivalent percent over said about 50 percent or more of said average residence time.

27. The process of claim 24 wherein said DMC catalyst is introduced into said reactor in admixture with a liquid selected from the group consisting of a starter molecule which is the same as said continuously added starter, an oxyalkylated continuously added starter molecule, a starter molecule not the same as the continuously added starter, a non-oxyalkylatable liquid, and mixtures thereof.

28. The process of claim 24 wherein the molecular weight of said continuously added starter molecules is from 18 Da to about 300 Da.

29. A continuous process for the preparation of a polyoxyalkylene polymer or copolymer of a number average molecular weight N, comprising establishing oxyalkylation conditions in a continuous reactor containing DMC catalyst; continuously adding alkylene oxide; continually adding further DMC catalyst in an amount sufficient to maintain oxyalkylation conditions; continuously adding continuously added starter having a molecular weight less than said number average molecular weight such that a concentration of said continuously added starter and/or a concentration of an oxyalkylated continuously added starter having a molecular weight less than said number average molecular weight N is maintained during a substantial portion of said oxyalkylation; and continuously withdrawing a polyoxyalkylene product of said number average molecular weight N.

30. A continuous process for the preparation of a polyoxyalkylene polyether product having a number average molecular weight N, employing continuous addition of starter, comprising:

a) establishing in a continuous reactor a first portion of a differential oxyalkylation catalyst/initial starter mixture effective to initiate polyoxyalkylation of said initial starter after introduction of alkylene oxide into said continuous reactor;

b) continuously introducing into said continuous reactor one or more alkylene oxides;

c) continuously introducing into said continuous reactor one or more continuously added starters which may be the same or different than said initial starter;

d) continuously introducing into said reactor further differential oxyalkylation catalyst/further starter mixture such that the catalytic activity is maintained;

e) polyoxyalkylating combined starters by continuously practicing at least steps b) through d) herein until a polyoxyalkylene polyether product of number average molecular weight N is obtained; and f) continuously removing said polyoxyalkylene polyether product from said continuous reactor.

31. A continuous process for the DMC catalyzed preparation of polyoxyalkylene polyethers, comprising:

a) introducing into a continuous reactor an effective polyoxyalkylation catalyzing amount of at least one DMC catalyst;

b) continuously introducing into said reactor one or more alkylene oxides;

c) continuously introducing into said reactor further DMC catalyst;

d) continuously introducing into said reactor one or more continuously added starter molecules, said continuously added starter molecules having an average molecular weight of from about 18 Da to 45,000 Da, such that a concentration of continuously added starter molecules is maintained for a portion of the average residence time of said reactor such that the proportion of high molecular weight tail is reduced as compared to the amount of high molecular weight tail contained in a polyol of the same composition and molecular weight prepared in a batch process where all starter is added at once; and e) continuously withdrawing a polyoxyalkylene polyether product having an equivalent weight in excess of 1000 Da.

* * * * *